United States Patent
Cheung et al.

(10) Patent No.: US 6,552,148 B1
(45) Date of Patent: Apr. 22, 2003

(54) α-OLEFIN/VINYL OR VINYLIDENE AROMATIC INTERPOLYMER PRODUCT AND PROCESS FOR MAKING SAME USING MULTIPLE CATALYST SYSTEMS (75) Inventors: Yunwa W. Cheung, Lake Jackson, TX (US); Martin J. Guest, Lake Jackson, TX (US); Robert K. Rosen, Houston, TX (US); Brian W. Kolthammer, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/506,422

(22) Filed: Feb. 17, 2000

Related U.S. Application Data (60) Provisional application No. 60/120,347, filed on Feb. 17, 1999.

(51) Int. Cl.[7] .................. C08F 212/04; C08F 232/02
(52) U.S. Cl. ................... 526/347; 526/118; 526/119; 526/281; 526/282; 526/308
(58) Field of Search .................. 526/119, 347, 526/118, 281, 282, 308

(56) References Cited

U.S. PATENT DOCUMENTS

| | | | | |
|---|---|---|---|---|
| 5,670,587 A | * | 9/1997 | Takeuchi et al. | 526/347 X |
| 5,866,659 A | | 2/1999 | Chung et al. | 525/279 |
| 6,066,709 A | | 5/2000 | Arai et al. | 526/347 |

FOREIGN PATENT DOCUMENTS

| | | | |
|---|---|---|---|
| DE | 197 11 339 A1 | 10/1997 | C08F/210/02 |
| EP | 0 416 815 A2 | 3/1991 | C08F/10/00 |
| EP | 0 739 906 A1 | 10/1996 | C08F/4/80 |
| WO | 97/42240 | 11/1997 | C08F/212/04 |
| WO | 98/09999 | 3/1998 | C08F/210/02 |

OTHER PUBLICATIONS

Soga, et al, "Copolymerization of Propylene and Styrene Using . . . TiCl3 and Cp2TiMe2", Macromolecules, 22(7) 2875–2878, Jul. 1989.*

International Search Report dated Jun. 15, 2000 issued by the EPO acting as the International Searching Authority in PCT/US00/04121.

* cited by examiner

*Primary Examiner*—Fred Teskin (57) ABSTRACT

The present invention relates to a thermoplastic interpolymer product comprising an α-olefin interpolymerized with at least one vinyl or vinylidene aromatic monomer and/or at least one hindered aliphatic or cycloaliphatic vinyl or vinylidene aromatic monomer and, in at least one aspect, is characterized as having substantially synergistic thermal properties. The invention also relates to a process for manufacturing the interpolymer product wherein the process employs two or more single site or metallocene catalyst systems in at least one reaction environment and wherein at least two of the catalyst systems have (a) different monomer incorporation capabilities or reactivities and (b) the same or, optionally, different monomer sequencing and/or tacticity characteristics. With unique thermal property attributes, the interpolymer product is useful, for example, for impact, bitumen and asphalt modification, adhesives, dispersions or latexes and fabricated articles such as, but not limited to, foams, films, sheet, moldings, thermoforms, profiles and fibers.

7 Claims, 7 Drawing Sheets

α-OLEFIN/VINYL OR VINYLIDENE AROMATIC INTERPOLYMER PRODUCT AND PROCESS FOR MAKING SAME USING MULTIPLE CATALYST SYSTEMS

CROSS-REFERENCE TO RELATED APPLICATIONS

This application claims the benefit from U.S. Provisional Application No. 60/120,347 filed on Feb. 17th, 1999, the entire contents of which are hereby incorporated by reference.

FIELD OF THE INVENTION

The present invention relates to a thermoplastic interpolymer product comprising an α-olefin interpolymerized with at least one vinyl or vinylidene aromatic monomer and/or at least one hindered aliphatic or cycloaliphatic vinyl or vinylidene aromatic monomer and, in at least one aspect, is characterized as having substantially synergistic thermal properties. The invention also relates to a process for manufacturing the interpolymer product wherein the process comprises employing two or more single site catalyst systems in at least one reaction environment (or reactor) and wherein at least two of the catalyst systems have (a) different monomer incorporation capabilities or reactivities and (b) the same or, optionally, different monomer sequencing and/or tacticity characteristics. With unique thermal property attributes, the interpolymer product is useful, for example, for impact, bitumen and asphalt modification, adhesives, dispersions or latexes and fabricated articles such as, but not limited to, foams, films, sheet, moldings, thermoforms, profiles and fibers.

BACKGROUND OF THE INVENTION

The generic class of materials covered by α-olefin/vinyl or vinylidene aromatic and/or hindered aliphatic or cycloaliphatic vinyl or vinylidene interpolymers and including materials such as substantially random α-olefin/vinyl aromatic interpolymers are known in the art and offer a range of material structures and properties which makes them useful in various applications. For example, U.S. Pat. No. 5,460,818, the disclosure of which is incorporated herein by reference, describes substantially random α-olefin/vinyl aromatic monomer interpolymers as compatibilizers for blends of polyethylene and polystyrene. However, known methods and procedures for manufacturing α-olefin/vinyl or vinylidene aromatic and/or hindered aliphatic or cycloaliphatic vinyl or vinylidene interpolymers do not provide independent control of material properties and attributes. That is, crystallinity, melting point and glass transition characteristics are known to inevitably vary with comonomer concentration where increase concentrations result in lower crystallinities, melting point temperatures, glass transition temperatures and service temperatures.

There are several known methods for preparing α-olefin/vinyl or vinylidene aromatic and/or hindered aliphatic or cycloaliphatic vinyl or vinylidene interpolymers such as those described by Francis J. Timmers et al. in U.S. application Ser. No. 08/708,869, filed Sep. 4, 1996 (now abandoned); John G. Bradfute et al. (W. R. Grace & Co.) in WO 95/32095; R. B. Pannell (Exxon Chemical Patents, inc.) in WO 94/00500; and in *Plastics Technology*, p. 25 (September 1992), the disclosures of which are incorporated herein by reference.

Numerous other preparative methods for α-olefin/vinyl or vinylidene aromatic and/or hindered aliphatic or cycloaliphatic vinyl or vinylidene interpolymers have been described in the literature. For example, Longo and Grassi (*Makromol. Chem.*, Volume 191, pages 2387 to 2396 [1990]) and D'Anniello et al. (*Journal of Applied Polymer Science*, Volume 58, pages 1701–1706 [1995]), the disclosures of which are incorporated herein by reference, reported the use of a catalytic system based on methylalumoxane (MAO) and cyclopentadienyltitanium trichloride (CpTiCl$_3$) to prepare an ethylene-styrene copolymer. Xu and Lin (*Polymer Preprints, Am. Chem. Soc., Div. Polym. Chem.*, Volume 35, pages 686,687 [1994]), the disclosure of which is incorporated herein by reference, have reported copolymerization using a MgCl$_2$/TiCl$_4$/NdCl$_3$/Al(iBu)$_3$ catalyst to give random copolymers of styrene and propylene. Lu et al. (*Journal of Applied Polymer Science*, Volume 53, pages 1453 to 1460 [1994]), the disclosure of which is incorporated herein by reference, have described the copolymerization of ethylene and styrene using a Ticl$_4$/NdCl$_3$/MgCl$_2$/al(Et)$_3$ catalyst. Sernetz and Mulhaupt, (*Macromol. Chem. Phys.*, V. 197, pp. 1071–1083, 1997), the disclosure of which is incorporated herein by reference, have described the influence of polymerization conditions on the copolymerization of styrene with ethylene using Me$_2$Si(Me$_4$Cp)(n-tert-butyl)TiCl$_2$/Methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*, Volume 38, pages 349, 350 [1997]), the disclosure of which is incorporated herein by reference. Also, random copolymers of ethylene and styrene having high isotacticity are disclosed in *Polymer Preprints*, Vol. 39, no. 1, March 1998 by Toru Aria et al., the disclosure of which is incorporated herein by reference.

Also several patent describe the manufacture of α-olefin/vinyl aromatic monomer interpolymers such as propylene/styrene and butene/styrene in U.S. Pat. No. 5,244,996, issued to Mitsui Petrochemical Industries Ltd.; U.S. Pat. No. 5,652,315, also issued to Mitsui Petrochemical Industries Ltd.; or DE 197 11 339 A1 to Denki Kagaku Kogyo KK, the disclosures of all three of which are incorporated herein by reference. Ethylene/styrene copolymer produced by bridged metallocene catalysts are also described in U.S. Pat. No. 5,652,315, issued to Mitsui Toatsu Chemicals, Inc.

Pseudo-random ethylene/vinyl aromatic interpolymers and the catalyst systems for making the same are disclosed in U.S. Pat. No. 5,703,187 and EP 416 815 A2, the disclosures of which are incorporated herein by reference.

U.S. patent application Ser. No. 08/991,836, filed Dec. 16, 1997 (now abandoned) and WO 98/10018, the disclosures of both of which are incorporated herein, in their entireties, by reference, indicate that a suitable method for manufacturing substantially random ethylene/vinyl aromatic interpolymers involves polymerizing a mixture of polymerizable monomers in the presence of one or more metallocene or constrained geometry catalysts in combination with various cocatalysts. However, the exemplified compositions therein all involve the same single catalyst composition of a titanium-based constrained geometry catalyst together with tris(pentafluorophenyl)boron as the activator and methylaluminoxane as the cocatalyst. That is, all reported examples were monocatalyzed interpolymers. Furthermore, there is no explicit disclosure in these descriptions that interpolymer made using multiple catalyst systems can provide improved thermal properties such as substantially higher meting points at substantially comparable crystallinities or diffused $T_g$ responses.

Blends comprising α-olefin/vinylidene aromatic monomer and/or hindered aliphatic or cycloaliphatic vinylidene monomer interpolymers are described in WO 95/27755, in the names of Chung P. Park et al. and WO 98/10018, in the names of Martin J. Guest et al., the disclosures of which are incorporated herein by reference. All of the exemplified compositions consisted of physical melt blend preparations using component interpolymers made from a single catalyst composition. That is, the blends were not made using an in-situ or multiple reactor interpolymerization technique, nor were they manufactured using multiple catalyst compositions and, as such, all component polymers were monocatalyzed.

Moreover, melt blending is not known to provide independent or unique control of thermal resistance, melting behavior and glass transition characteristics as no complete data of such attributes are reported in WO 95/27755 nor WO 98/10018. Thus it remains, although known α-olefin/vinyl or vinylidene aromatic interpolymers have several important attributes, they also exhibit several important deficiencies. For example, known α-olefin/vinyl or vinylidene aromatic interpolymer compositions, whether monocatalyzed or the melt blends, are characterized as having relatively low maximum service temperatures and narrow glass transition temperature ranges or widths (i.e. less than 15° C.) which limit their usefulness for elevated temperature service/applications as well as for applications which require the effective glass transition to span across a broad temperatures range. It is an object of the present invention to solve the problem of deficient thermal characteristics exhibited by known α-olefin/vinyl or vinylidene aromatic interpolymers.

SUMMARY OF THE INVENTION

We have discovered a new family of α-olefin/vinyl aromatic interpolymer products which are characterized as having substantially synergistic and improved thermal characteristics. The broad aspect of the invention is an interpolymer product comprising an α-olefin interpolymerized with at least one vinyl or vinylidene aromatic monomer wherein the interpolymer product is characterized as having:

A1) a melting point, as determined using differential scanning calorimetry, equal to or greater than the product of the equation:

melting point=128−1.3333×total weight percent interpolymerized vinyl and/or vinylidene aromatic monomer, preferably, equal to or greater than the product of the equation:

melting point=144−1.53×total weight percent interpolymerized vinyl and/or vinylidene aromatic monomer, more preferably, equal to or greater than the product of the equation:

melting point=160−1.66667×total weight percent interpolymerized vinyl and/or vinylidene aromatic monomer, or A2) a highest peak melting point temperature (as determined using differential scanning calorimetry (DSC)) or a maximum service temperature (as determined using thermal mechanical analysis (TMA)) equal to or greater than 16 percent, preferably 30 percent, more preferably 50 percent higher than the melting point or maximum service temperature of a CAT2 monocatalyzed substantially random α-olefin/vinyl or vinylidene aromatic monomer interpolymer having an equivalent total mol percent interpolymerized vinyl and/or vinylidene aromatic monomer concentration, or B) a glass transition temperature range or width at half peak temperature height of greater than or equal to 15° C., preferably greater than or equal to 20° C., more preferably greater than or equal to 25° C., most preferably greater than or equal to 30° C., as determined using dynamic mechanical spectroscopy (DMS) loss modulus (G") data.

In a preferred embodiment, the inventive interpolymer product comprises ethylene as the α-olefin and styrene as the at least one vinyl or vinylidene aromatic monomer and is characterized as having:

A) a highest peak melting point temperature (as determined using differential scanning calorimetry (DSC)) or a maximum service temperature (as determined using thermal mechanical analysis (TMA)) equal to or greater than 16 percent, preferably 30 percent, more preferably 50 percent higher than the melting point or maximum service temperature of a CAT2 monocatalyzed substantially random ethylene/styrene interpolymer having an equivalent total mol percent interpolymerized vinyl and/or vinylidene concentration, or B) a glass transition temperature range or width at half peak temperature height of greater than or equal to 15° C., preferably greater than or equal to 20° C., more preferably greater than or equal to 25° C., most preferably greater than or equal to 30° C., as determined using dynamic mechanical spectroscopy (DMS) loss modulus (G") data.

In other embodiments, the interpolymer product is dominantly substantially random, random, or alternating (i.e. more than 50 weight percent of the product is characterized as having the particular sequence). Preferably, the product is more than 70 weight percent, more preferably more than 80 weight percent and most preferably more than 90 weight percent substantially random. In especially preferred embodiments, the interpolymer product is substantially random with respect to all incorporated vinyl or vinylidene aromatic monomer sequences of more than three units.

In other embodiments, the interpolymer product can be partially substantially random, random, alternately, diadic, triadic, tetradic or any combination thereof. That is, the interpolymer product can be variably incorporated and optionally variably sequenced. For example, the interpolymer product can be variably incorporated and dominantly substantially random where the two catalyst systems (e.g. CAT1 and CAT2) employed both characteristically provide a substantially random monomer sequencing. Such is believed to be the case as to incorporation even where the incorporation ratio between the two catalyst systems is 50/50. The interpolymer product can be variably incorporated and variably sequenced where, for example, the two catalyst systems employed both characteristically provide a different monomer sequence.

In still other embodiments, the inventive interpolymer product can be variably incorporated and optionally variably sequenced and/or variably atactic, isotactic, syndiotactic or a combination thereof. That is, the inventive interpolymer product can have a mixed, the same or a different tacticity (i.e. atactic, isotactic, syndiotactic or combinations thereof with respect to any partial or total sequence variety. Of particular interest (especially for elastic article applications) is an embodiment where the interpolymer product has improved thermal property attributes and comprises random, substantially random or alternating (or any combination thereof hard and soft segments or blocks.

Where the interpolymer has a high degree of alternating monomer sequencing (i.e. the interpolymer gives peaks at all three chemical shift regions of the main chain methylene and methyne carbons and the peak areas of these regions is not less than 70 percent of the total peak area of the main chain methylene and methyne carbons), a high degree of isotacticity (i.e. the isotactic diad is not less than 0.55) is most preferred Another aspect of the invention is an interpolymer product comprising α-olefin and at least one vinyl or vinylidene aromatic monomer made using at least two single site catalyst systems in at least one reaction environment or reactor wherein the catalyst systems are selected and operated to provide different monomer incorporation capabilities or reactivities.

A third aspect of the invention is a process for making an interpolymer product, the product comprising an α-olefin interpolymerized with at least one vinyl or vinylidene aromatic monomer, the process comprising a) selecting at least two single site catalyst systems, b) feeding the catalysts systems to at least one reaction environment or reactor, and c) controlling the reaction environment (or reactor), catalyst systems and interpolymerization conditions such that the catalyst systems operate or function at different vinyl or vinylidene aromatic monomer incorporation capabilities or interpolymerization reactivity rates.

In certain aspects, the inventive interpolymer product has surprisingly improved thermal properties. For example, thermal property attributes can be controlled independent of monomer concentration and substantially independent of crystallinity or glass transition peak temperature. In particular aspects, as unique features, the melting point and/or thermal resistance of the inventive interpolymer product is substantially higher than that of a comparative substantially random interpolymer having an equivalent vinyl or vinylidene aromatic concentration and/or substantially comparably crystallinity. Alternatively, in other aspects and when amorphous, the inventive interpolymer product is surprisingly characterized by a more diffuse (i.e. broader) $T_g$ temperature range or width at equivalent vinyl or vinylidene aromatic concentration.

In particular embodiments, the inventive interpolymer product is characterized by various physical property enhancements such as, but not limited to, improved processability in terms of shear thinning and melt strength improvement from molecular weight control; improved mechanical properties such as impact resistance and tensile elongation; improved control of stress relaxation and elastic recovery attributes; improved control of surface characteristics for enhancement such as paintability; and combinations thereof.

The commercial benefit of the present invention is now α-olefin/vinyl or vinylidene aromatic interpolymers with improved thermal characteristics are available. With improvements such as, for example, significantly higher maximum service temperatures, it now possible to provide elastic articles (e.g. waist bands in undergarments) which retain their elastic properties after exposure to elevated temperatures such as laundry dryers.

DETAILED DESCRIPTION OF THE INVENTION

The term "interpolymer" is used herein to indicate a polymer wherein at least two different monomers are polymerized. That is, the polymer contains a plurality of polymerized monomers as such two, three, four and so on.

The term "copolymer" as employed herein means a polymer wherein at least two different monomers are polymerized to form the copolymer. Thus, as used herein, there is overlap between the terms "interpolymer" and "copolymer" as, herein, both terms can refer to a polymer comprised of, for example, three polymerized monomers.

The term "different catalyst systems" is used herein in reference to catalyst systems which incorporate monomers at different amount during interpolymerization. While the term principally refers to catalyst systems having different chemical compositions relative to one another, the term generally refers to any difference that results in different monomer incorporation or different polymerization reactivities or rates. As such, the term also refers to differences in concentrations, operating conditions, injection methods or timing and the like where the catalyst systems have the same chemical composition.

The term "variably incorporated" as used herein refers an interpolymer product manufactured using at least two catalyst systems wherein during interpolymerization the catalyst systems are operated at different incorporation or reactivity rates. For example, the interpolymer product having a total styrene content of 36 weight percent is variably incorporated where one catalyst system incorporates 22 weight percent styrene and the other catalyst system incorporates 48 weight percent styrene and the production split between the two catalyst systems is 47/53 weight percentages.

Suitable "alternating" interpolymers are those in which the aliphatic alpha-olefin monomer (A) and hindered vinylidene monomer (B) occur in repeat alternate sequences on the polymer chain in atactic or stereospecific structures (such as isotactic or syndiotactic) or in combinations of the general formula $(AB)_n$.

Suitable "random" interpolymers are those in which the monomer units are incorporated into the chain wherein can there exist various combinations of ordering including blockiness where either the aliphatic alpha-olefin monomer (A) or hindered vinylidene monomer (B) or both can be repeated adjacent to one another.

Substantially random ethylene/vinyl or vinylidene aromatic interpolymers are especially preferred interpolymer products of the present invention. Representative of substantially random ethylene/vinyl aromatic interpolymers are substantially random ethylene/styrene interpolymers.

The term "substantially random" in the substantially random interpolymer resulting from polymerizing one or more α-olefin monomers and one or more vinyl or vinylidene aromatic monomers or hindered aliphatic or cycloaliphatic vinyl or vinylidene monomers, and optionally, with other polymerizable ethylenically unsaturated monomer(s) as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer resulting from polymerizing one or more α-olefin monomers and one or more vinyl or vinylidene aromatic monomer, and optionally, with other polymerizable ethylenically unsaturated monomer(s) does not contain more than 15 percent of the total amount of vinyl or vinylidene aromatic monomer residue in blocks of vinyl or vinylidene aromatic monomer of more than 3 units. More preferably, the interpolymer is not characterized by a high degree of either isotacti city or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Pseudorandom interpolymers are a subset of substantially random interpolymers. Pseudorandom interpolymers are characterized by an architecture in which all phenyl (or substituted phenyl) groups which are pendant from the polymer backbone are separated by two or more carbon backbone units. In other words, the pseudorandom interpolymers of the invention, in their noncrosslinked state, can be described by the following general formula (using styrene as the vinyl aromatic monomer and ethylene as the α-olefin for illustration):

where j, k, and l≧1.

Noncrosslinked pseudorandom interpolymers are described in European Patent Publication 416,815-A.

While not wishing to be bound by any particular theory, it is believed that during the addition polymerization reaction of, for example, ethylene and styrene, in the presence of a constrained geometry catalyst as described below, if a styrene monomer is inserted into the growing polymer chain, the next monomer inserted will be an ethylene monomer or a styrene monomer inserted in an inverted or "tail-to-tail" fashion. It is believed that after an inverted or "tailto-tail" styrene monomer is inserted, the next monomer will be ethylene, as the insertion of a second styrene monomer at this point would place it too close to the inverted styrene monomer, that is, less than two carbon backbone units away.

Preferably, the substantially random interpolymer will be characterized as largely atactic, as indicated by a 13C-NMR spectrum in which the peak areas corresponding to the main chain methylene and methine carbons representing either meso diad sequences or racemic diad sequences does not exceed 75 percent of the total peak area of the main chain methylene and methine carbons.

Substantially random interpolymers which are suitable for use in the present invention include, substantially random interpolymers prepared by polymerizing i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s)

Suitable α-olefins include for example, α-olefins containing from 2 to 20, preferably from 2 to 12, more preferably from 2 to 8 carbon atoms. Particularly suitable are ethylene, propylene, butene-1, 4-methyl-1-pentene, hexene-1 or octene-1 or ethylene in combination with one or more of propylene, butene-1, 4-methyl-1-pentene, hexene-1 or octene-1. These α-olefins do not contain an aromatic moiety.

Suitable vinyl or vinylidene aromatic monomers which can be employed to prepare the interpolymer product include, for example, those represented by the following formula:

wherein $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; Ar is a phenyl group or a phenyl group substituted with from about 1 to about 5 substituents selected from the group consisting of halo, $C_{1-4}$-alkyl, and $C_{1-4}$-haloalkyl; and n has a value from zero to about 4, preferably from zero to about 2, most preferably zero. Particularly suitable such monomers include styrene and lower alkyl- or halogen-substituted derivatives thereof. Exemplary monovinyl or monovinylidene aromatic monomers include styrene, vinyl toluene, α-methylstyrene, t-butyl styrene or chlorostyrene, including all isomers of these compounds. Preferred monomers include styrene, α-methyl styrene, the lower alkyl- ($C_1$–$C_4$) or pheny-ring substituted derivatives of styrene, such as for example, ortho-, meta-, and para-methylstyrene, the ring halogenated styrenes, para-vinyl toluene or mixtures thereof. A more preferred aromatic monovinyl monomer is styrene.

By the term "sterically hindered aliphatic or cycloaliphatic vinyl or vinylidene monomers", it is meant addition polymerizable vinyl or vinylidene monomers corresponding to the formula:

wherein $A^1$ is a sterically bulky, aliphatic or cycloaliphatic substituent of up to 20 carbons, $R^1$ is selected from the group of radicals consisting of hydrogen and alkyl radicals containing from about 1 to about 4 carbon atoms, preferably hydrogen or methyl; each $R^2$ is independently selected from the group of radicals consisting of hydrogen and alkyl radicals containing from about 1 to about 4 carbon atoms, preferably hydrogen or methyl; or alternatively $R^1$ and $A^1$ together form a ring system.

By the term "sterically bulky" is meant that the monomer bearing this substituent is normally incapable of addition polymerization by standard Ziegler-Natta polymerization catalysts at a rate comparable with ethylene polymerizations.

α-Olefin monomers containing from about 2 to about 20 carbon atoms and having a linear aliphatic structure such as ethylene, propylene, butene-1, hexene-1 and octene-1 are not considered to be sterically hindered aliphatic monomers.

Preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl or norbornyl. Most preferred sterically hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The inventive interpolymer product usually contains from about 5 to about 65, preferably from about 5 to about 55, more preferably from about 10 to about 50 mole percent of at least one vinyl or vinylidene aromatic monomer; or sterically hindered aliphatic or cycloaliphatic vinyl or vinylidene monomer; or both; and from about 35 to about 95, preferably from about 45 to about 95, more preferably from about 50 to about 90 mole percent of at least one aliphatic α-olefin having from about 2 to about 20 carbon atoms.

Other optional polymerizable ethylenically unsaturated monomer(s) include strained ring olefins such as norbornene and $C_1$–$C_{10}$-alkyl or $C_6$–$C_{10}$-aryl substituted norbornenes, with an exemplary substantially random interpolymer being ethylene/styrene/norbornene.

The most preferred inventive interpolymer product are interpolymers of ethylene and styrene and interpolymers of ethylene, styrene and at least one α-olefin containing from about 3 to about 8 carbon atoms.

The number average molecular weight ($M_n$) of the inventive interpolymer product is usually greater than 5,000, preferably from about 20,000 to about 1,000,000, more preferably from 50,000 to 500,000.

Semi-crystalline inventive interpolymer products (i.e. those having a measurably crystallinity using differential scanning calorimetry) can be conveniently characterized by DSC crystallinity, DMS glass transition temperature, DSC highest peak melting point temperature and maximum service temperature by thermal mechanical analysis (TMA). Conversely, amorphous inventive interpolymer products (i.e. those having no measurable crystallinity using differential scanning calorimetry and which typically contain greater than 48 weight percent vinyl or vinylidene aromatic monomer) are conveniently characterized by glass transition characteristics (i.e., $T_g$ and peak widths at half peak temperature height) as determined using dynamic mechanical spectroscopy (DMS).

The glass transition temperature ($T_g$) of the inventive interpolymer product is preferably in the range from about −40° C. to about +60° C., more preferably from about −30° C. to about +50° C., most preferably from about −10° C. to about +40° C., as measured by differential mechanical scanning (DMS) using loss modulus (G") data. The melting point of the inventive semicrystalline interpolymer product is preferably in the range from about 0° C. to about 160° C., as determined using differential scanning calorimetry (DSC).

In especially preferred embodiments, the inventive interpolymer product has a polydispersity greater than 4, preferably greater than 7, as determined using gel permeation chromatography (GPC).

The inventive interpolymer product may be modified by typical grafting, hydrogenation, functionalizing, or other reactions well known to those skilled in the art. The interpolymer product may be readily sulfonated or chlorinated to provide functionalized derivatives according to established techniques. The interpolymer product may also be modified by various chain extending or crosslinking processes including, but not limited to peroxide-, silane-, sulfur-, radiation-, or azide-based cure systems. A full description of the various cross-linking technologies is described in copending U.S. patent application Ser. No. 08/921,641 U.S. Pat. No. 5,869,591 and U.S. Ser. No. 08/921,642 U.S. Pat. No. 5,977,291, both filed on Aug. 27, 1997, the disclosures of both of which are incorporated herein by reference.

Dual cure systems, which use a combination of heat, moisture cure, and/or radiation steps, may also be effectively employed. Dual cure systems are disclosed and claimed in U.S. patent application Ser. No. 536,022, filed on Sep. 29, 1995 abandoned, in the names of K. L. Walton and S. V. Karande, the disclosure of which is incorporated herein by reference. Particularly desirable dual-cure systems employ peroxide crosslinking agents in conjunction with silane crosslinking agents, peroxide crosslinking agents in conjunction with radiation, sulfur-containing crosslinking agents in conjunction with silane crosslinking agents, and combinations thereof.

The inventive interpolymer product may also be modified by various other crosslinking processes including, but not limited to, the incorporation of a diene component as a termonomer in its preparation and subsequent crosslinking by the aforementioned methods and further methods including vulcanization via the vinyl group using sulfur for example as the crosslinking agent.

The interpolymer product can also be mixed or blended (including melt blended) with other natural and/or synthetic materials such as, including, but not limited to, conventional (i.e. those not variably incorporated) α-olefin/vinyl or vinylidene aromatic interpolymers, substantially linear ethylene interpolymers, homogeneously branched linear ethylene interpolymers, heterogeneously branched linear ethylene interpolymers (e.g., linear low density polyethylene (LLDPE), medium density polyethylene (MDPE), high density polyethylene (HDPE) and ultra low or very low density polyethylene (ULDPE or VLDPE)), elastomers, rubbers, polystyrene (especially high impact polystyrenes (HIPs)), styrene block polymers (e.g. styrene butadiene block copolymers, styrene/ethylene propylene/styrene block copolymers, styrene/ethylene-butylene/styrene block copolymers, styrene/isoprene/styrene block copolymers, and styrene/butadiene/styrene block copolymers), polyethers (especially aromatic polyethers), polypropylene, polysulfones, polycarbonates, polyamides, ABS, epoxies, ethylene/propylene interpolymers, anhydride modified polyethylenes (e.g., maleic anhydride grafted LLDPE and HDPE) as well as high pressure polyethylenes such as, for example, but not limited to, low density polyethylene (LDPE), ethylene/acrylic acid (EAA) interpolymers and ionomers, ethylene/methacrylic acid (EMAA) interpolymers and ionomers, ethylene/vinyl acetate (EVA) interpolymers and ethylene/methacrylate (EMA) interpolymers, and any combination thereof.

The inventive interpolymer product is manufacture using (that is, by contacting monomers with) at least two single site or metallocene catalyst systems in at least one reaction environment or reactor. In particular embodiments, the process comprises at two reaction environments or reactors operated in series or parallel, and preferably in series configuration.

The interpolymerization process can be solution, gas phase, particle form (i.e. slurry or dispersion polymerization) type or any combination thereof such as where multiple reaction environments or reactors are employed and at least one environment or reactor is in solution mode and at least one other is in particle form or gas phase mode. But, a solution interpolymerization process is preferred.

Preferably, interpolymerization operating conditions comprise pressures from about atmospheric up to about 3,000 atmospheres and temperatures from about −30° C. to about 200° C.

The at least one reaction environment or reactor may be a sphere, stirred tank, tube or loop configuration or design or any combination thereof such as where multiple reaction environments or reactors are employed. However, a loop configuration (including a multiple loop configuration) is preferred due to its tendency to provide improved product conversion and productivity.

One method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, the disclosures of which are incorporated herein by reference. Such a method of preparation of the substantially random interpolymers includes polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185, the disclosures of all of which are incorporated herein by reference.

The substantially random α-olefin/vinyl aromatic interpolymers can also be prepared by the methods described in JP 07/278230 employing compounds shown by the general formula where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), the disclosures of which are incorporated herein by reference.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 (now abandoned) and WO 98/09999 both by Francis J. Timmers et al., the disclosures of all of which are incorporated herein by reference. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, for example an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

Other suitable catalysts for use in the present invention include, but are not limited to, those represented by the formula:

wherein each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, hydrogen, halo, hydrocarbyl, hydrocarbyloxy, silahydrocarbyl, hydrocarbylsilyl containing up to about 30 preferably from 1 to about 20 more preferably from 1 to about 10 carbon or silicon atoms or two R' groups together can be a $C_1$–$C_{10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-$C_{1-4}$ alkyl, racemic-(dimethylsilanediyl)-bis-(2-methyl-4-phenylindenyl)zirconium di-$C_{1-4}$ alkoxide, or any combination thereof and the like.

Also included are the titanium-based catalysts, [N-(1,1-dimethylethyl)-1,1-dimethyl-1-[(1,2,3,4,5-h)-1,5,6,7-tetrahydro-s-indacen-1-yl]silanaminato(2-)-N]titanium dimethyl; (1-indenyl) (tert-butylamido)dimethyl-silane titanium dimethyl; ((3-tert-butyl)(1,2,3,4,5-h-)-1-indenyl)(tert-butylamido)dimethylsilane titanium dimethyl; and ((3-isopropyl)(1,2,3,4,5-h-)-1-indenyl)(tert-butylamido) dimethylsilane titanium dimethyl, or any combination thereof and the like.

Other suitable catalyst systems for use as at least one, both or all of the least two catalyst systems required by the inventive process include, but are not limited to, those described by Longo and Grassi in *Makromol. Chem.*, Volume 191, pages 2387 to 2396 [1990]; D'Anniello et al. in *Journal of Applied Polymer Science*, Volume 58, pages 1701–1706 [1995]; Xu and Lin in *Polymer Preprints, Am.Chem.Soc.,Div.Polym.Chem.*, Volume 35, pages 686, 687 [1994]; Lu et al. in *Journal of Applied Polymer Science*, Volume 53, pages 1453 to 1460 [1994]; Sernetz and Mulhaupt, in *Macromol. Chem. Phys.*, v. 197, pp 1071–1083, 1997); and Arai, Toshiaki and Suzuki in *Polymer Preprints, Am.Chem.Soc.,Div.Polym.Chem.*, Volume 38, pages 349, 350 [1997].

Still other suitable catalyst systems for use as at least one, both or all of the least two catalyst systems required by the inventive process include, but are not limited to, those described or used in *Plastics Technology*, p. 25 (September 1992); WO 98,10018 by Martin J. Guest et al; WO 95/27755 by Chung P. Park et al.; WO 95/32095 by John G. Bradfute et al. (W. R. Grace & Co.); WO 94/00500 by R. B. Pannell (Exxon Chemical Patents, Inc.); WO 97/42240 by Van Tol et al.; U.S. application Ser. No. 07/545,403, filed Jul. 3, 1990 corresponding to EP-A-416,815; U.S. application Ser. No. 07/702,475, filed May 20, 1991 (now abandoned) corresponding to EP-A-514,828; U.S. application Ser. No. 07/876,268, filed May 1, 1992, now U.S. Pat. No. 5,721,185 and corresponding to EP-A-520,732; U.S. application Ser. No. 08/241,523; filed May 12, 1994 (now abandoned); U.S. application Ser. No. 08/991,836, filed Dec. 16, 1997; as well as EP 0 892 014; DE 197 11 339; DE 195 42 356 based on WO 97/18248; and U.S. Pat. Nos.: 5,460,818; 5,62,315; 5,703,187; 5,055,438; 5,057,475; 5,096,867; 5,064,802; 5,132,380; 5,189,192; 5,321,106; 5,347,024; 5,043,408; 5,350,723; 5,314,696; 5,399,635; 5,460,993; 5,244,996; and 5,556,928, all of which US patents arc incorporated herein by reference in their entireties. Other particularly suitable catalyst systems include, but are not limited to, that described by Francis J. Timmers et al. in U.S. Pat. No. 6,191,245 B1, and those based on the cation, $\eta^1$:$\eta^5$-tert-Butyl(dimethyl-fluorenylsilyl)-amido{bis(trimethylsilyl) methyl}titanium(II), described by Guangxue Xu, Institute of Polymer Science, Zhongshan University, Guangzhou 510275, the disclosures of which US patent is incorporated herein by reference.

The preferred class of single site or metallocene catalyst system for use in the present invention as at least one, both or all of the at least two catalyst systems is a constrained geometry catalyst system. More preferably, both and most preferably all of the at least two catalyst systems are constrained geometry catalyst systems.

The interpolymer product with its unique thermal property attributes is useful in a variety of applications including, for example, for impact, bitumen and asphalt modification, adhesives, dispersions or latexes and fabricated articles such as, but not limited to, foams, films, sheet, moldings (especially compression and injection molding), coatings (especially extrusion coating) thermoforms, profiles and fibers (especially elastic fibers and nonwoven fabrics or composites).

Test Methods

The molecular weight and molecular weight distribution of the interpolymer product of the present invention can be conveniently determined using gel permeation chromatography (GPC) procedures and methods.

The melting point and weight percent crystallinity of the interpolymer product can be conveniently determined by differential scanning calorimetry using a Dupont DSC-910 unit. In order to eliminate any previous thermal history, samples are first heated to 200° C. Heating and cooling curves are recorded at 10° C./minute. Melting (from second heat) and crystallization temperatures are recorded from the peak temperatures of the endotherm and exotherm, respectively. The peak with the highest amplitude is taken as the melting point temperature for the sample. The highest amplitude requirement is especially important where a curve shows multiple peaks or a peak is associated with a shoulder or hump. Weight percent crystallinity (based on the total weight of the interpolymer product) is taken from an integration of the area under the endothermic curve to provide heat of fusion (in Joules/gram) which is then divided by 292 Joules/gram.

The glass transition temperature of the interpolymer product is determined using solid state dynamic mechanical spectroscopy (DMS) wherein compression molded samples are tested using a Rheometrics 800E mechanical spectrometer. Compression molded sample preparation is performed by melting the sample at 190° C. for 3 minutes and compression molding at 190° C. and under 20,000 lbs. (9072 kg) of pressure for another 2 minutes. Subsequently, the molten material is quenched in a press equilibrated to room temperature. The DMS testing is performed in torsional rectangular geometry mode under a constant nitrogen purge of about 2 scm. Samples are cooled to −100° C. and run at a fixed oscillation frequency of 10 rad/sec using a torsional set strain of 0.05 percent. Loss modulus (G") data from ramped temperatures are collected isothermally at 5° C. intervals. From a plot of loss modulus (G") versus temperature in degrees Celsius, the peak with the highest amplitude (in dynes/cm$^2$) is taken as the glass transition temperature (peak $T_g$ temperature) in ° C. for the sample.

Figure 1:
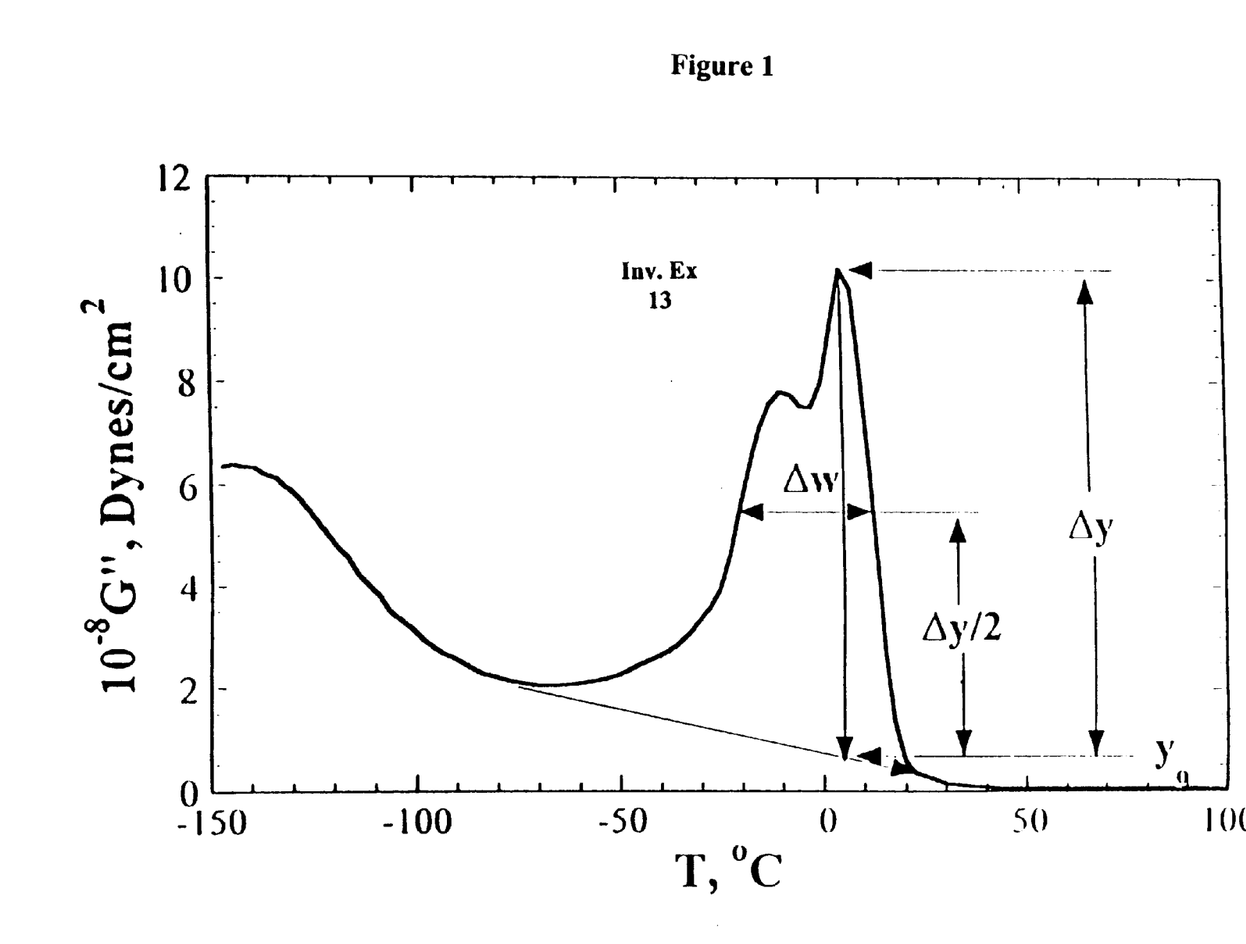
FIG. 1 shows the baseline method applied to the G" versus temperature curve of Inventive Example 13.

The plot of loss modulus (G") versus temperature in degrees Celsius is also used to determine the peak width at half the height of the peak $T_g$ temperature for the inventive interpolymer product. The baseline of the loss modulus versus temperature plot can be conveniently drawn using the baseline method wherein a straight line tangent to the G" versus temperature curve is drawn as illustrated in FIG. 1. Half peak height (in dynes/cm$^2$) is the value (in dynes/cm$^2$) at the apex of the peak with highest amplitude divided by 2.

The glass transition temperature range or width is the measure in °C. across the peak at half height. For particular precision, the x-y coordinates at the apex of the peak with the highest amplitude and at that peak's half height can be determined using a DMS software add-ons or by importing the curve into a data analysis software package such as, for example, ORGIN supplied by MicroCal which feature cursor displays or assignments for the coordinates.

The maximum service temperature of the inventive interpolymer product is conveniently determined using a thermal mechanical analyzer (Perkin-Elmer TMA 7 series). Samples are scanned at 5° C./minute and the load is set at 1 Newton. The point at which the TMA probe penetrates 1 mm into the sample is taken as the maximum service temperature for the sample.

The weight percent styrene and atactic polystyrene for the interpolymer product can be conveniently determined using proton nuclear magnetic resonance ($^1$H N.M.R). In the determinations, NMR samples are prepared in 1,1,2,2-tetrachloroethane-$d_2$ (TCE-$d_2$) at 1.6–3.2 percent polymer by weight. For each determination, product is weighed directly into a 5 mm sample tube, a 0.75 mL aliquot of TCE-$d_2$ is added by syringe and the tube is capped with a tight-fitting polyethylene cap. The sample is heated in a water bath at 85° C. to soften the sample. To provide mixing, the capped samples are occasionally brought to reflux about three separate times for about 15 seconds using a heat gun. The sample is loaded into the Proton NMR unit immediately after the last reflux subsides.

Proton NMR spectra are accumulated on a Varian VXR 300 with the sample probe at 80° C. and referenced to the residual protons of TCE-$d_2$ at 5.99 ppm. Delay times are about 1 second and data are collected in triplicate on each sample. The total analysis time per sample is about 10 minutes and the instrumental conditions were as follows:

Varian VXR-300, standard $^1$H:
Sweep Width, 5000 Hz
Acquisition Time, 3.002 sec
Pulse Width, 8 $\mu$sec
Frequency, 300 MHz
Delay, 1 sec
Transients, 16

Initially, a $^1$H NMR spectrum for a sample of the polystyrene, STYRON™ 680 (available form the Dow Chemical Company, Midland, Mich.) is acquired with a delay time of one second. The protons are "labeled": β, branch; α, alpha; o, ortho; m, meta; ρ, para, as shown in FIG. 1 of U.S. patent application Ser. No. 08/991,836.

Integrals are measured around the labeled protons. Integral $A_{7.1}$ (aromatic, around 7.1 ppm) is believed to be the three ortho/para protons; and integral $A_{6.6}$ (aromatic, around 6.6 ppm) the two meta protons. The two aliphatic protons labeled α resonate at 1.5 ppm; and the single proton labeled b resonate at 1.9 ppm. The aliphatic region is integrated from about 0.8 to 2.5 ppm and is referred to as $A_{al}$.

Region $A_{6.6}$ is assigned the value of 1. Ratio Al is integral $A_{al}/A_{6.6}$. All spectra collected have a 1.5:1:1.5 integration ratio of (o+p): m: (α+b). The ratio of aromatic to aliphatic protons is 5 to 3. The aliphatic ratio is 2 to 1.

The following equations are used to determine the degree of styrene incorporation in the interpolymer product:

(C Phenyl)=$C_{7.1}$+$A_{7.1}$−(1.5×$A_{6.6}$)
(C Aliphatic)=$C_{al}$−(15×$A_{6.6}$)
$s_c$=(C Phenyl)/5
$e_c$=(C Aliphatic−(3×$s_c$))/4
E=$e_c$/($e_c$+$s_c$)
$S_c$=$s_c$/($e_c$+$s_c$)

and the following equations were used to calculate the mol percent ethylene and styrene in the interpolymer products.

$$\text{Wt \% } E = \frac{E*28}{(E*28)+(S_c*104)}(100)$$

and $$\text{Wt \% } S = \frac{S_c*104}{(E*28)+(S_c*104)}(100)$$

where $s_c$ and $e_c$ are styrene and ethylene proton fractions in the interpolymer product, respectively, and $S_c$ and E are mole fractions of styrene monomer and ethylene monomer in the interpolymer product, respectively.

The weight percent of aPS in the interpolymer product is determined by the following equation:

$$\text{Wt \% } aPS = \frac{(\text{Wt \% }S)*\left(\frac{\frac{A_{6.6}}{2}}{S_c}\right)}{100+\left[(\text{Wt \% }S)*\left(\frac{\frac{A_{6.6}}{2}}{S_c}\right)\right]}*100$$

The total styrene content can also be determined by quantitative Fourier Transform Infrared spectroscopy (FTIR) and by Raman spectroscopy.

EXAMPLES 1, 2 and 13

Polymerization experiments were performed to manufacture Inventive Examples 1, 2 and 13 using a 1 gallon stirred Autoclave Engineers reactor. For each example, the reactor was charged with the desired amounts of toluene and styrene using a mass flow meter. Hydrogen was added by expansion from a 75 mL vessel, then the reactor was heated to the desired polymerization temperature and saturated with ethylene to the desired pressure. The catalyst was prepared in a drybox by successively adding solutions of MMAO-3A (Akzo Nobel); B($C_6F_5$)$_3$ (Boulder Scientific); CAT1 (Titanium, [1,1'-(h4-1,3-butadiene-1,4-diyl)bis[benzene]] [1-[(1,2,3,3a,11b-h)-1H-cyclopenta[I]phenanthren-1-yl]-N-(1,1-dimethylethyl)-1,1-dimethylsilanaminato(2-)-kN]- (CAS #199876-47-6)); and CAT2 (i.e. Titanium, [N-(1,1-dimethylethyl)-1,1-dimethyl-1-[(1,2,3,4,5-h)-2,3,4,5-tetramethyl-2,4-cyclopentadien-1-yl]silanaminato(2-)-kN] [(1,2,3,4-h)-1,3-pentadiene]-(CAS #169104-71-6)) to enough additional solvent to give a total volume of 12 mL. The catalyst solution was then transferred by syringe to a catalyst addition loop and injected into the reactor over approximately 2 minutes using a flow of high pressure solvent (toluene). The polymerization was allowed to proceed for 10 minutes while feeding ethylene on demand to maintain the desired pressure. The amount of ethylene consumed during the reaction was monitored using a mass flow meter. The interpolymer product solution was dumped from the reactor into a nitrogen-purged glass kettle. An aliquot of an additive solution (66.7 g of IRGAFOS® 168 and 33.3 g of IRGANOX® 1010, both supplied by Ciba Specialty Chemicals, in 500 mL of toluene) was added to this kettle in the amounts noted in Table 1 and the solution stirred thoroughly. The interpolymer product solution was dumped into a tray, air dried for several days, then thoroughly dried in a vacuum oven. The weights of the interpolymer products were recorded and their efficiencies calculated as grams of polymer per gram of titanium.

TABLE 1

| Inventive Example | 1 | 2 | 13 |
|---|---|---|---|
| Temperature, (° C.) | 90 | 95 | 75 |
| $C_2$ Pressure, (psig) | 200 | 300 | 100 |
| $C_2$ loaded, (g) | 85.0 | 119.7 | 48.5 |
| Toluene, (g) | 800 | 800 | 600 |
| Styrene, (g) | 800 | 800 | 1000 |
| $H_2$, (psig) | 50 | 25 | 25 |
| $H_2$, (mmol) | 10.4 | 5.2 | 5.2 |
| CAT2 (μmol) | 10 | 10 | 10 |
| CAT1 (μmol) | 2 | 1 | 1 |
| Ti/B/Al* | 1:5:5 | 1:5:5 | 1:5:5 |
| $C_2$ Max Rate, (g/min) | 41.2 | 42.5 | 3.7 |
| $C_2$ Total, (g) | 117.1 | 111.7 | 21.5 |
| Additive Solution (mL) | 2.2 | 2.3 | 0.4 |
| Polymer Yield, g poly | 246.0 | 141.2 | 68.6 |
| Efficiency (g poly/g Ti) | 427,975 | 267,983 | 130,195 |
| Mw | | 269.6 | 244.3 | 381.5 |
| Mn | 34.2 | 21.7 | 22.5 |
| Mw/Mn | 7.9 | 11.3 | 17.0 |
| % Interpolymerized Styrene by wt. (NMR) | 47.8 | 35.8 | 64.8 |
| % aPS by wt. (NMR) | 3.3 | 5.4 | 13.0 |

*Refers to molar ratio of Ti(CAT1 + CAT2) to B($C_6F_5$) and MMAO-3A

Comparative Runs 3–12, 14, 16 and 17

The same polymerization run as described above for Inventive Example 1 was separately repeated, except only CAT1 (with the same activator and cocatalyst and molar ratios) was used to manufacture comparative runs 3–7 and only CAT2 1 (with the same activator and cocatalyst and molar ratios) was used to manufacture comparative runs 8–12, 14, 16 and 17. That is, these comparative runs were all monocatalyzed.

Comparative Run 15

Comparative run 15 was prepared from a melt blend of two component polymers (comparative runs 16 and 17). The actual melt blending was performed using a Haake mixer equipped with a Rheomix 3000 bowl. About 180 grams of the component polymers (total) were first dry blended, then fed into the mixer and permitted to equilibrate to 190° C. The feeding and temperature equilibration took about 3 to 5 min. The molten material was mixed at 190° C. and 40 rpm for about 10 minutes and then removed from the mixer and permitted to cool to ambient.

The physical properties of the Inventive Examples 1 and 2 and comparative runs 3–12 were determined according to procedures and methods described herein above or incorporated herein above by reference. The results of these determinations are reported in Table 2.

TABLE 2

| Example | Wt % Styrene | DSC Melting Point, ° C. | DSC Wt % Crystallinity | TMA Max. Service Temp., ° C. |
|---|---|---|---|---|
| Inv. Ex 1 | 36 | 100 | 15 | 99 |
| Inv. Ex 2 | 48 | 80 | 6 | 66 |
| Run 3 | 42 | 26 | 3 | 50 |
| Run 4 | 35 | 54 | 10 | 64 |
| Run 5 | 30 | 61 | 13 | 74 |
| Run 6 | 47.8 | 20 | 1 | ND |
| Run 7 | 35.8 | 52 | 10 | ND |
| Run 8 | 28 | 77 | 18 | ND |
| Run 9 | 47.8 | 43 | 3 | ND |
| Run 10 | 35.8 | 70 | 15 | ND |
| Run 11 | 30.7 | 69 | 8 | ND |
| Run 12 | 22 | 84 | 17 | ND |

ND denotes not determined.

The glass transition temperature and temperature range or width was determined for Inventive Example 13 and several other comparative runs, including the melt blended sample (comparative run 15). Table 3 reports the glass transition test results.

TABLE 3

| Example | Wt % Styrene | DMS $T_g$ Temp., ° C. | $T_g$ Temp Range or Width, ° C. |
|---|---|---|---|
| Inv. Ex 13 | 65 | −11, 5* | 34 |
| Inv. Ex 13 | 65 | 15 | |
| Run 14 | 66 | 14* | 10 |
| Run 14 | 66 | 20 | |
| Run 15 | 65 | 2, 24* | 11, 10 |
| Run 16 | 73 | 25* | 10 |
| Run 16 | 73 | 31 | |
| Run 17 | 58 | −3* | 11 |
| Run 17 | 58 | 3 | |
| Run 18 | 26 | −7 | |
| Run 19 | 52 | −2 | |
| Run 20 | 48 | −5 | |
| Run 21 | 56 | 3 | |
| Run 22 | 67 | 21 | |

*Denotes the glass transition temperature was determined from G" data as opposed to tan δ (G"/G') data. All Tg width determination were performed using G" data.

Figure 2:
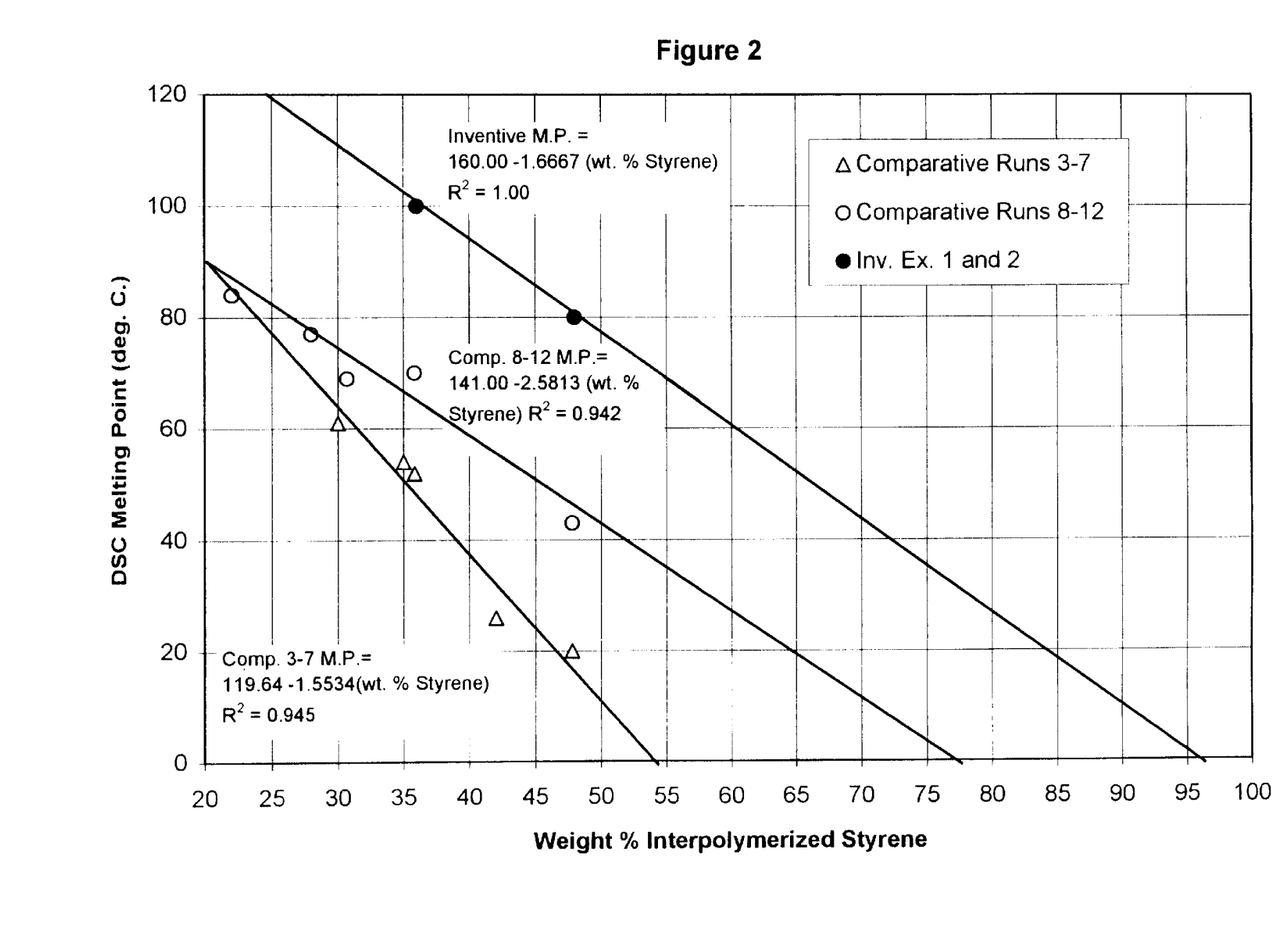
FIG. 2 is a plot of the highest peak melting point versus weight percent interpolymerized styrene for Inventive Examples 1 and 2 and comparative runs 3–12.
Figure 3:
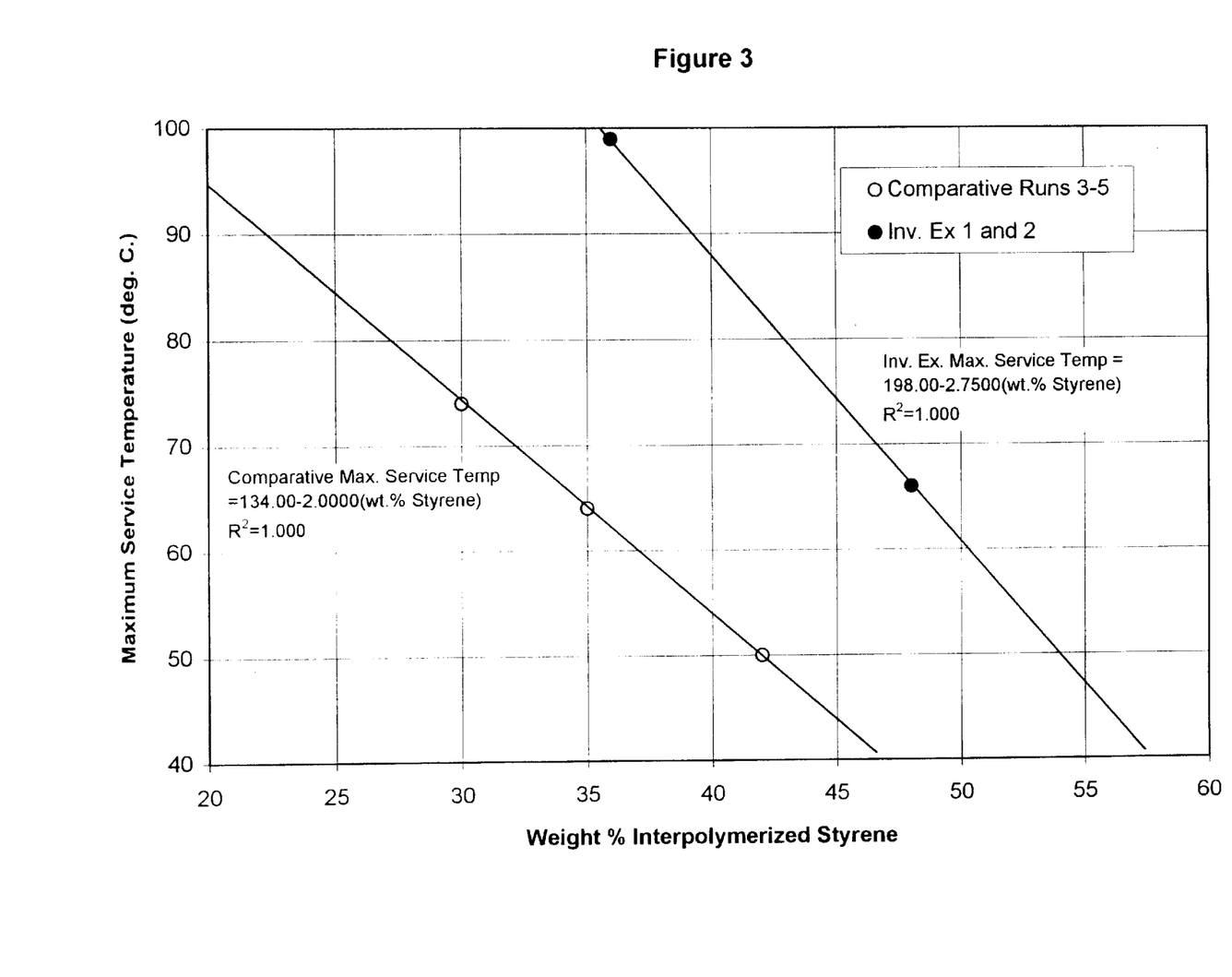
FIG. 3 is a plot of the maximum service temperature versus weight percent interpolymerized styrene for Inventive Examples 1 and 2 and comparative runs 3–5.

FIGS. 2 and 3 show Inventive Examples 1 and 2 exhibit substantially synergistic thermal properties. The DSC melting point and TMA maximum service temperature of these semi-crystalline interpolymer products were significantly improved over monocatalyzed interpolymers.

Figure 4:
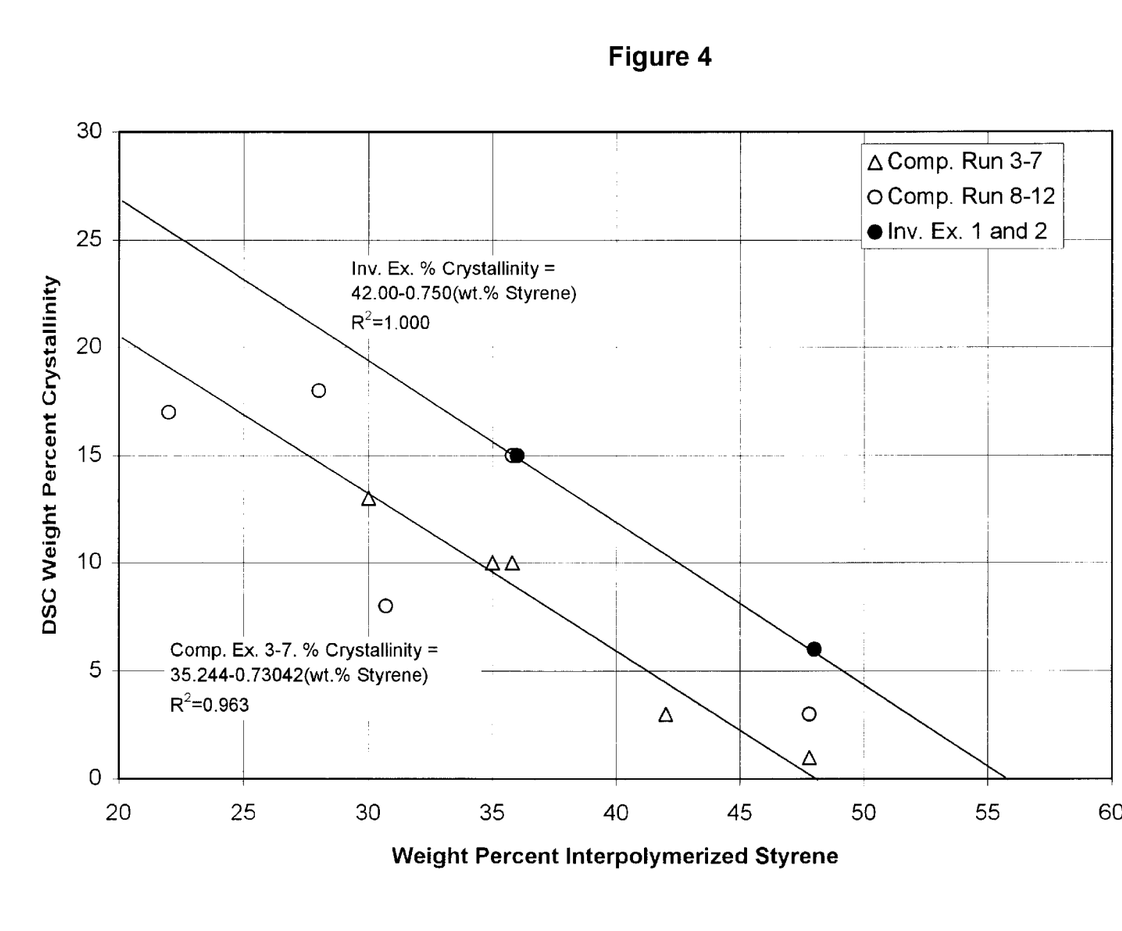
FIG. 4 is a plot of the weight percent crystallinity versus weight percent interpolymerized styrene for Inventive Examples 1 and 2 and comparative runs 3–12.

In contrast to FIGS. 2 and 3, FIG. 4 indicates that the weight percent crystallinity for the inventive examples is generally higher than that of comparative monocatalyzed CAT1 interpolymers and substantially equivalent to that of comparative interpolymers monocatalyzed CAT2 interpolymers. Or at least, the crystallinity results of monocatalyzed CAT2 interpolymers vary widely.

Figure 5:
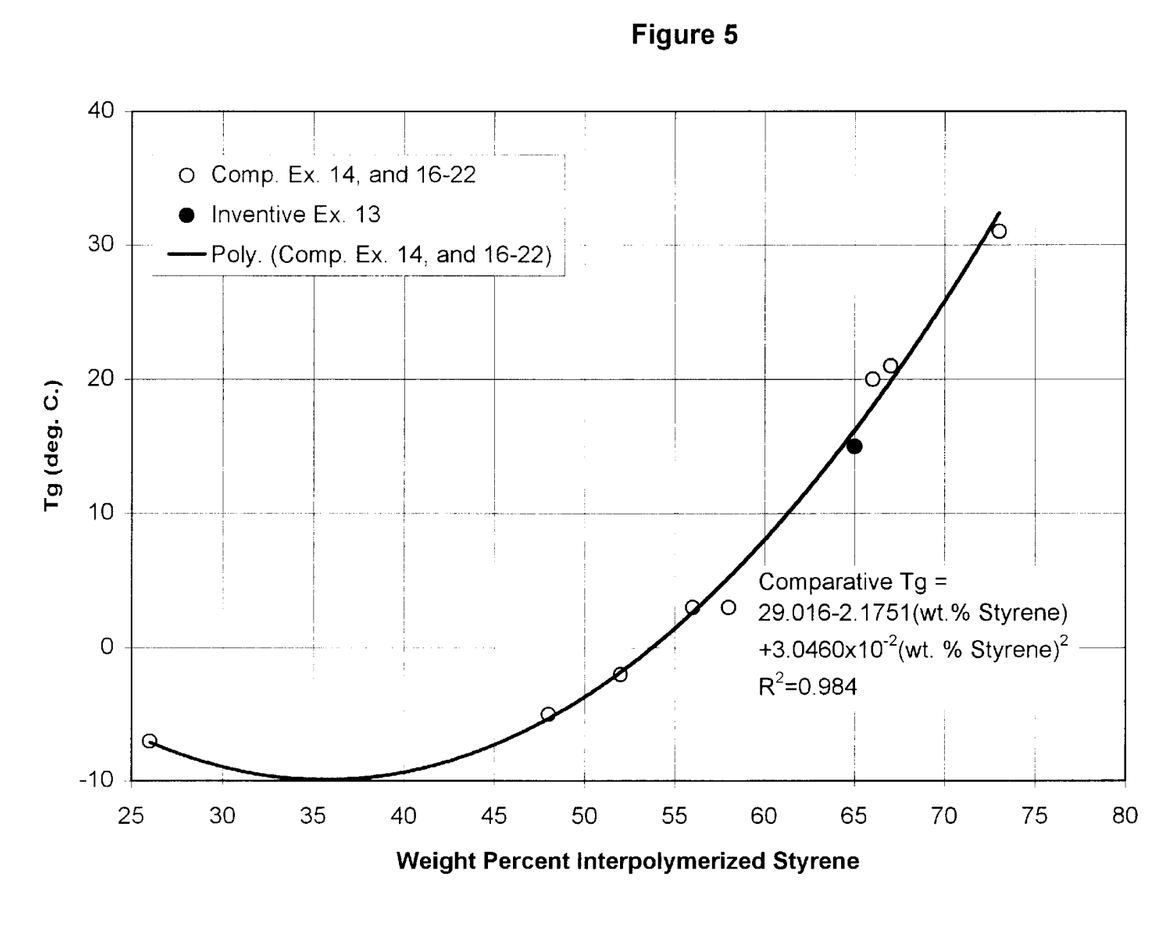
FIG. 5 is a plot of the Tg (by tan δ) versus weight percent interpolymerized styrene for Inventive Example 13 and several monocatalyzed comparative runs.
Figure 6:
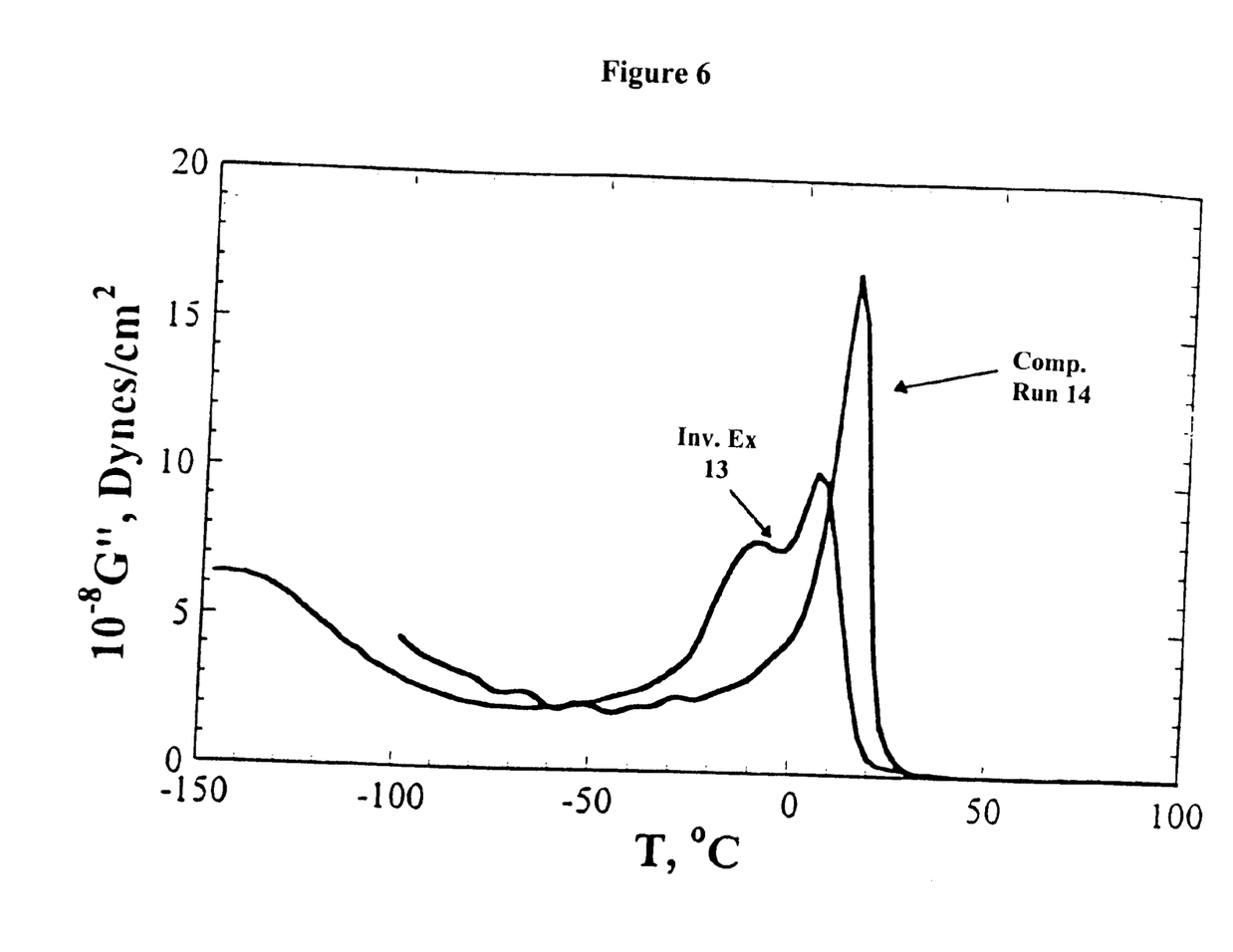
FIG. 6 shows an overlay of the G" versus temperature curves for Inventive Example 13 and comparative run 14.
Figure 7:
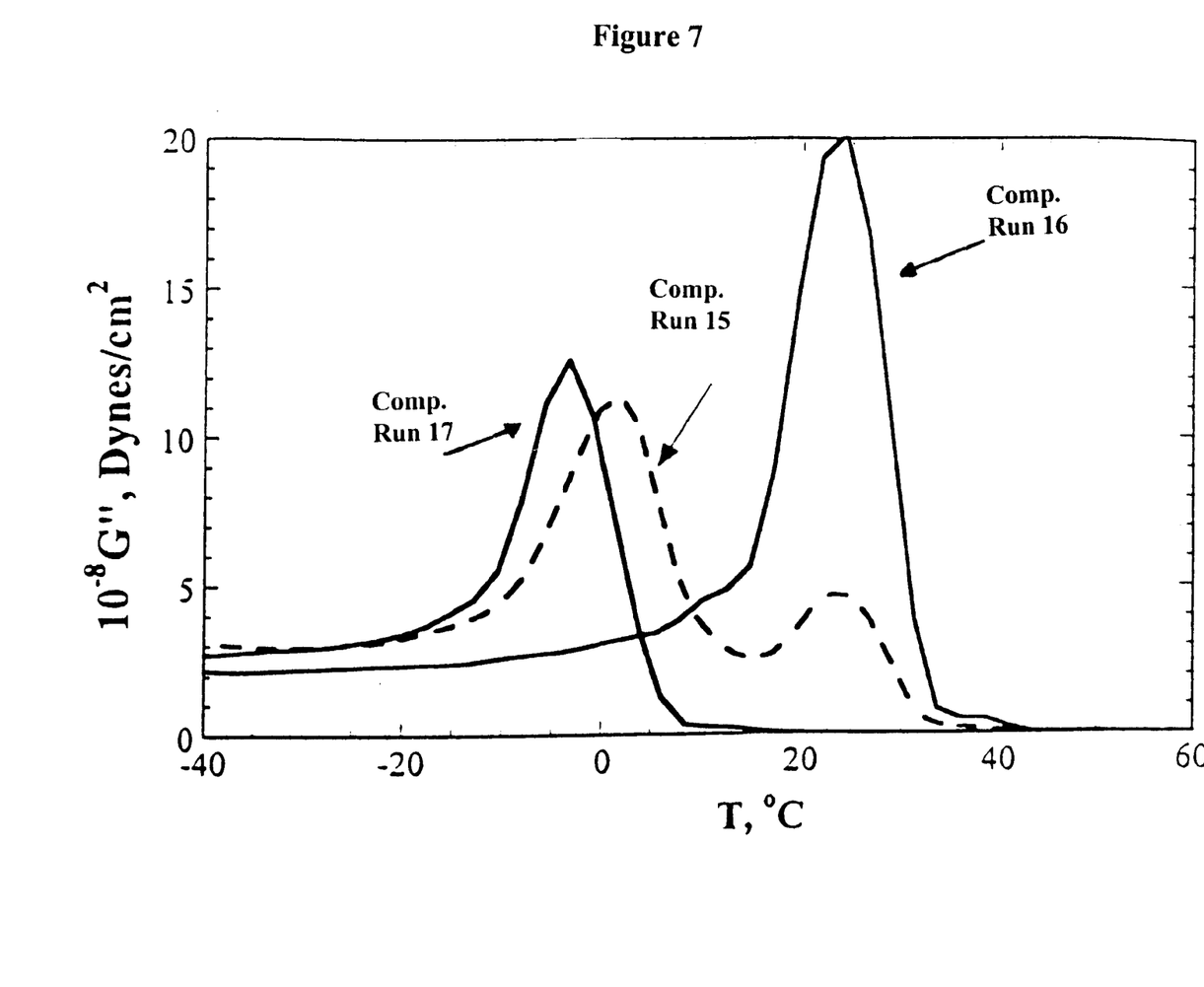
FIG. 7 shows an overlay of the G" versus temperature curves for comparative runs 15–17.

While FIG. 5 shows that the Tg temperature of Inventive Example 13 is generally similar to that of monocatalyzed comparative interpolymer. But FIG. 6 show the Tg temperature range or width of Inventive Example 13 is substantially broader than comparative interpolymer. FIG. 7 shows that typical melt blends substantially approximate the Tg width of their respective component interpolymers. Since Inventive Example 13 would ordinarily be expected to follow melt blend results and performance attributes, the fact that the inventive product is characterized by (1) a single Tg peak having a shoulder rather than two separate and distinct peaks and (2) a substantially broader Tg width is a completely unexpected surprise.

What is claimed is:

1. A pseudorandom interpolymer product comprising an α-olefin interpolymerized with at least one vinyl or vinylidene aromatic monomer or hindered aliphatic or cycloaliphatic vinyl or vinylidene monomer, wherein the product comprises
   (1) from 27 to 46 mol percent of polymer units derived from (i) the vinyl or vinylidene aromatic monomer represented by the following formula:

wherein $R^1$ is selected from the group of radicals consisting of hydrogen and alkyl radicals containing from about 1 to about 4 carbon atoms; each $R^2$ is independently selected from the group of radicals consisting of hydrogen and alkyl radicals containing from about 1 to about 4 carbon atoms; Ar is a phenyl group or a phenyl group substituted with from about 1 to about 5 substituents selected from the group consisting of halo, $C_{1-4}$-alkyl, and $C_{1-4}$ haloalkyl; and n has a value from zero to about 4; or (ii) the hindered aliphatic or cycloaliphatic vinyl or vinylidene monomer is represented by the following general formula;

wherein $A^1$ is a sterically bulky aliphatic or cycloaliphatic substituent of up to 20 carbons, $R^1$ is selected from the group of radicals consisting of hydrogen and alkyl radicals containing from 1 to 4 carbon atoms; each $R^2$ is independently selected from the group of radicals consisting of hydrogen and alkyl radicals containing from 1 to 4 carbon atoms; or alternatively $R^1$ and $A^1$ together form a ring system; and (2) from 54 to 73 mol percent of polymer units derived from the α-olefin which comprises ethylene, or ethylene and at least one of propylene, 4-methyl-1-pentene, butene-1, hexene-1 and octene-1, wherein the interpolymer product is characterized as having:

A) a melting point, as determined using differential scanning calorimetry, equal to or greater than the product of the equation:

melting point=128−1.3333×total weight percent interpolymerized vinyl and/or vinylidene aromatic monomer, or B) a glass transition temperature range or width at half peak temperature height of greater than or equal to 15° C., as determined using dynamic mechanical spectroscopy (DMS) loss modulus (G") data.

2. The interpolymer of claim 1 comprising ethylene, styrene and at least one α-olefin containing from 3 to 8 carbons.

3. The interpolymer of claim 1 made using at least two single site catalyst systems in at least one reaction environment or reactor wherein the catalyst systems are selected and operated to provide different monomer incorporation capabilities or reactivities.

4. The interpolymer product of claim 3 wherein at least one of the at least two catalyst systems is a constrained geometry catalyst system.

5. The interpolymer product of claim 3 wherein at least two of the at least two catalyst systems are constrained geometry catalyst systems.

6. The interpolymer product of claim 3 wherein all of the at least two catalyst systems are constrained geometry catalyst systems.

7. A process for making the interpolymer product of claim 1, the process comprising:

a) selecting at least two single site catalyst systems, b) feeding the catalyst systems to at least one reaction environment or reactor, and c) controlling the reaction environment (or reactor), catalyst systems and interpolymerization conditions such that the catalyst systems operate or function at different vinyl or vinylidene aromatic monomer incorporation capabilities or interpolymerization reactivity rates.

* * * * *